Aug. 7, 1945.   J. W. JONES   2,381,757
AIRCRAFT IDENTIFYING AND RANGE ESTIMATING TRAINER
Filed Aug. 24, 1943   3 Sheets-Sheet 1
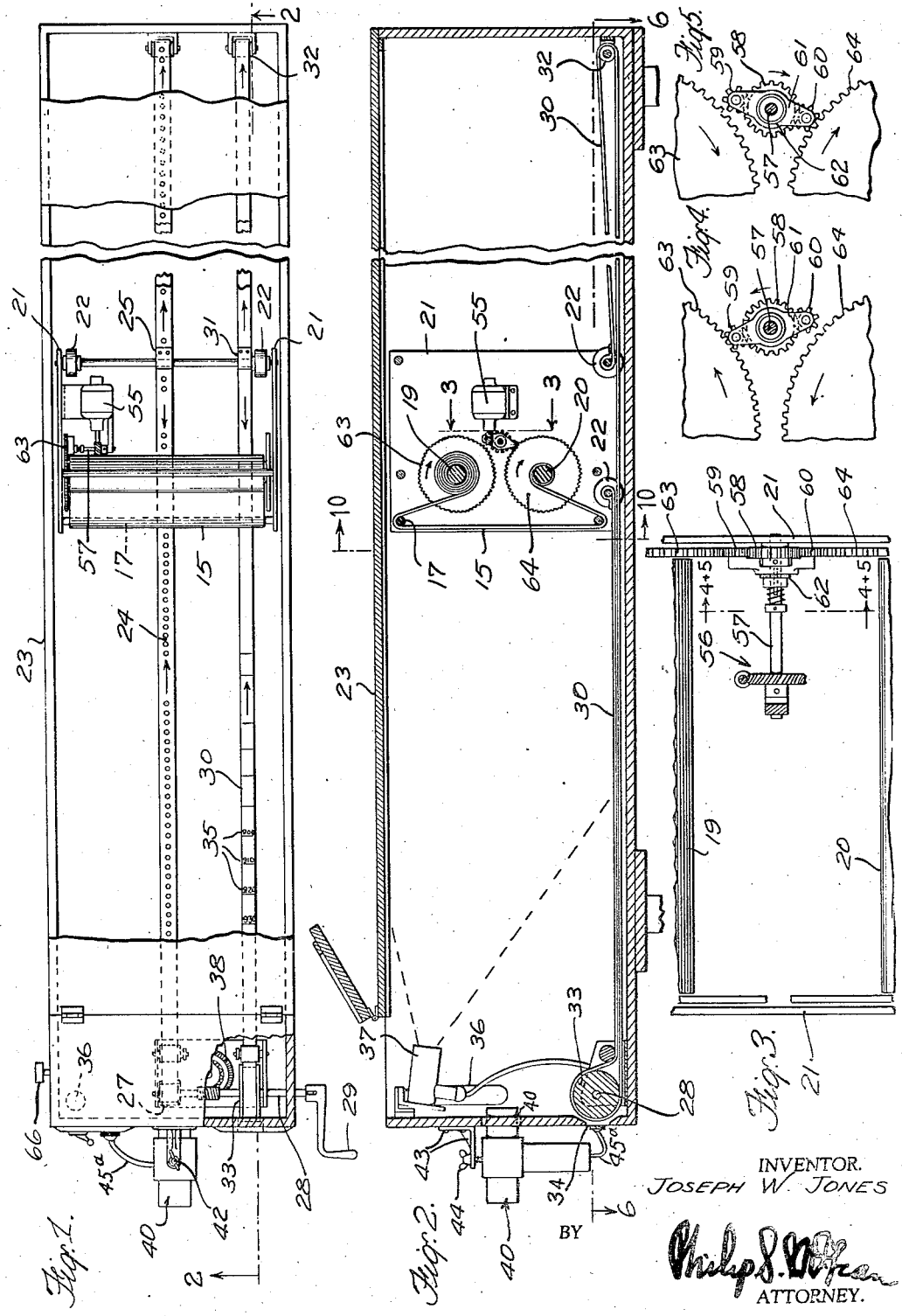
INVENTOR.
JOSEPH W. JONES
BY
ATTORNEY.

Aug. 7, 1945. J. W. JONES 2,381,757
AIRCRAFT IDENTIFYING AND RANGE ESTIMATING TRAINER
Filed Aug. 24, 1943 3 Sheets-Sheet 2
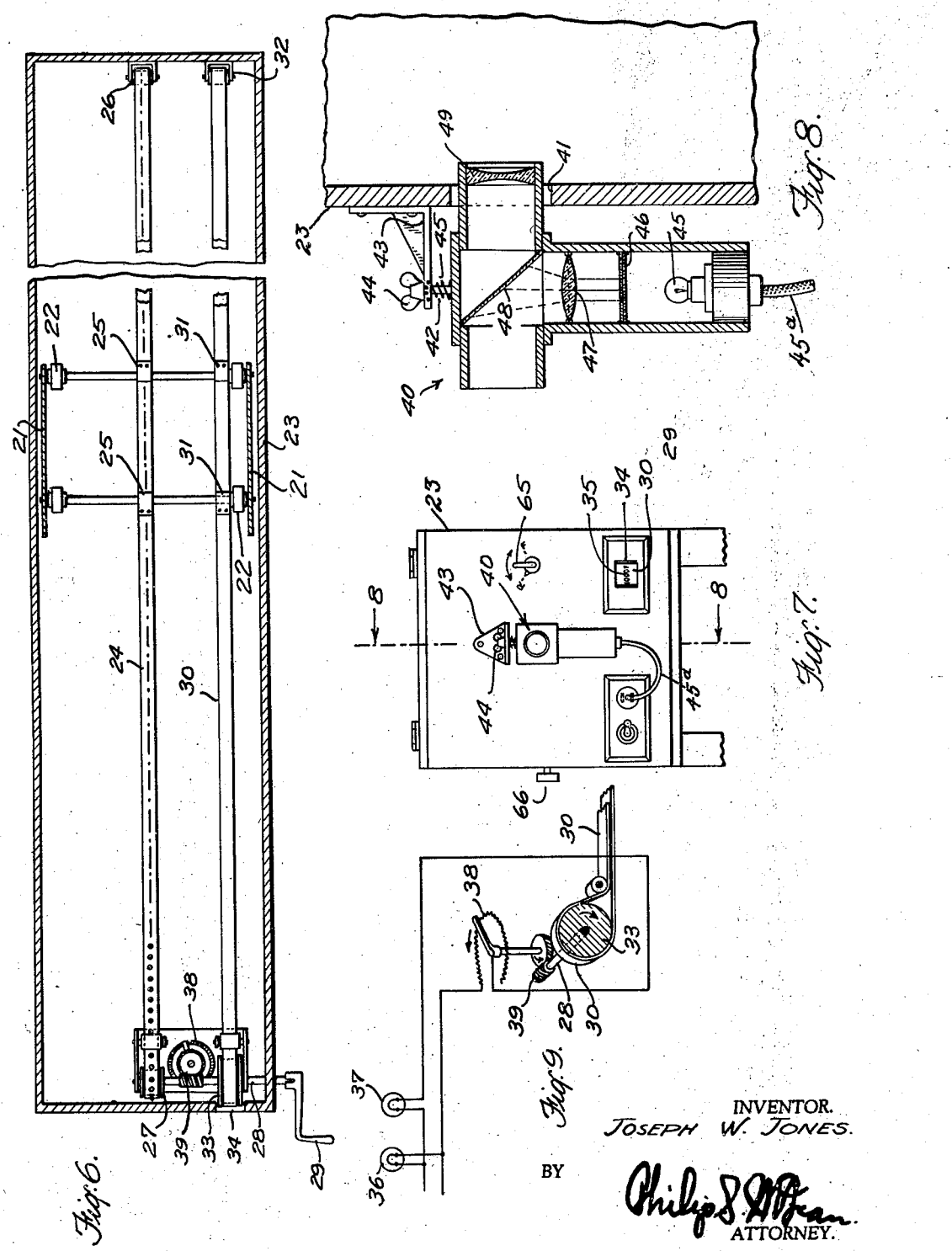
INVENTOR.
JOSEPH W. JONES.
BY
Philip S. M'Kean
ATTORNEY.

Aug. 7, 1945. J. W. JONES 2,381,757
AIRCRAFT IDENTIFYING AND RANGE ESTIMATING TRAINER
Filed Aug. 24, 1943 3 Sheets-Sheet 3
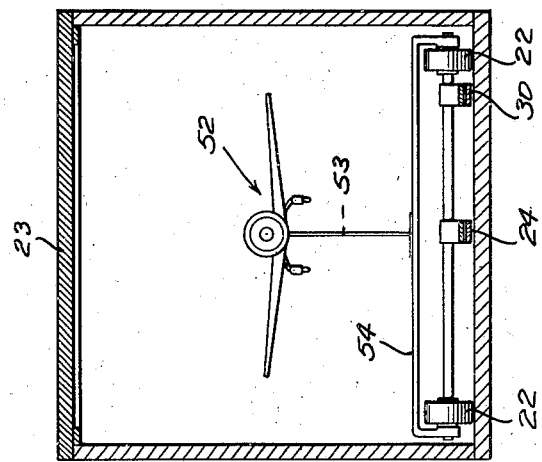
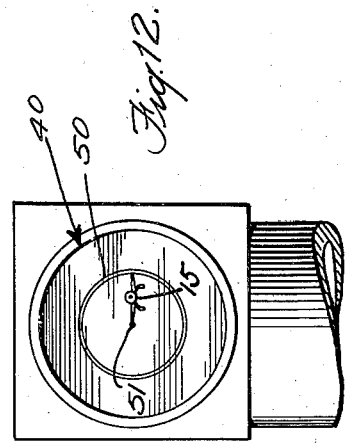
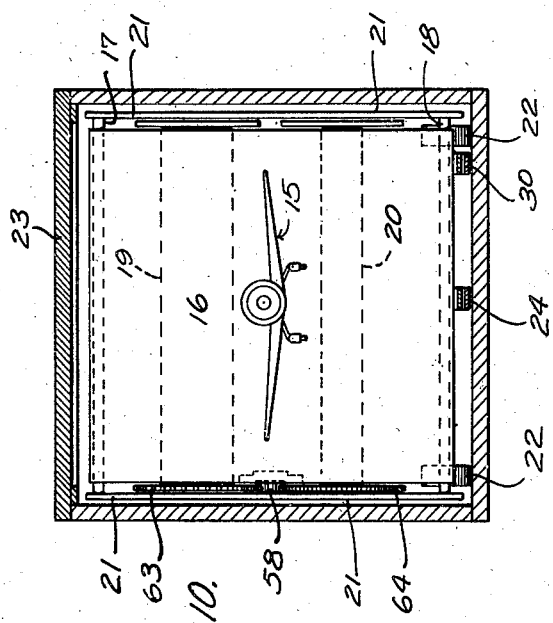
INVENTOR.
JOSEPH W. JONES
BY
ATTORNEY.

Patented Aug. 7, 1945

2,381,757

UNITED STATES PATENT OFFICE 2,381,757

AIRCRAFT IDENTIFYING AND RANGE ESTIMATING TRAINER

Joseph W. Jones, New York, N. Y.

Application August 24, 1943 Serial No. 499,866

7 Claims. (Cl. 35—25)

The invention herein disclosed relates to apparatus for training and instructing in the identification of aircraft and the estimation of range, speed and other related factors.

Special objects of the invention are to provide apparatus for the purpose, which will realistically portray and simulate actual conditions as to appearance and action of aircraft, with the various effects of distance, direction and speed of movement, differences in lighting and the like, and which, while portraying all such desired effects, will be of reasonably small size adapted to be used in an ordinary class room.

Further objects of the invention are to provide such apparatus in a form which may be conveniently controlled, as by an instructor or by the student, to portray different conditions and the changes from one condition to another and which will be of practical value in quickly and fully accustoming and instructing students in gunnery and related problems.

Other desirable objects and the novel features of invention by which all such various purposes are accomplished are set forth or will appear in the course of the following specification.

The drawings accompanying and forming part of the specification illustrate present commercial embodiments of the invention. Structure however, may be modified and changed in various ways, all within the true intent and broad scope of the invention as hereinafter defined and claimed.

Fig. 1 in the drawing is a broken plan view of one of the machines.

Fig. 2 is a longitudinal vertical sectional view as on substantially the line 2—2 of Fig. 1.

Fig. 3 is an enlarged broken sectional view as on substantially the line 3—3 of Fig. 2, illustrating gearing for rolling the illustration sheet in opposite directions.

Figs. 4 and 5 are broken part sectional details of the automatically shifting reverse gear drive for the illustration sheet, as on the line marked 4 and 5, Fig. 3.

Fig. 6 is a horizontal sectional view as on substantially the line 6—6 of Fig. 2.

Fig. 7 is a broken end elevation of the machine.

Fig. 8 is an enlarged broken sectional detail of the sighting and reducing lens unit.

Fig. 9 is a diagrammatic view of the automatic lighting control.

Fig. 10 is a transverse vertical sectional view on substantially the plane of line 10—10 of Fig. 2.

Fig. 11 is a similar view illustrating another form of aircraft depicting means.

Fig. 12 is a broken front view illustrating the appearance of the aircraft in the sighting tube.

In the form of the invention first shown, scale models of aircraft are illustrated in silhouette form, as shown at 15, in Fig. 10, on a sheet 16, which is stretched over rods 17, 18, at top and bottom and wound on reversible rolls 19, 20.

These rods and rolls are shown mounted between end plates 21, which by the provision of rollers 22, constitutes the whole, a carriage for travel in a light box 23.

The box 23, is shown in the form of an elongated light tight casing, in which the aircraft portraying carriage may move back and forth under the pull of a tape 24, connected with the carriage at 25, looped about a roller 26, on the back wall of the casing and extending around a drive sprocket 27, at the front wall of the casing.

The carriage driving sprocket 27, is shown carried by a shaft 28, extending out through the side wall of the casing and provided with a crank 29, for hand operation. If desired though, this shaft may be motor driven and suitably controlled.

A second tape 30, is shown connected with the carriage at 31, looped over roll 32, at the back and extended about a larger roll 33, at the front in back of a reading opening 34, in the front wall of the casing. Distance markings 35, on this tape provide a gage and a check for the student and instructor, which can be observed through the window 34.

While the separate yardage tape may be preferred, it is contemplated that the distance markings may be provided right on the drive tape 24, and an exposure window be located in front of the sprocket 27.

The aircraft image constituting the target is illuminated in the present disclosure by a constant light 36, and a controlled light 37, the first designed to illuminate the full interior of the casing and the second constituting in effect a spot light directed on the target and governed according to the distance of the target from the eye of the observer.

The inner walls of the casing and the silhouette strip are preferably light reflective but even under the best conditions, there is a tendency toward a so-called "deep well effect" as the target travels away from the observer. The spot light 37, projected directly onto the target as in Fig. 2, overcomes this deep well effect and provides proper illumination of the target even when farthest removed from the eye of the observer.

As the target approaches the observer however, the need for the spot light becomes less and less and a point may be reached where the target will be sufficiently illuminated entirely from the lamp or lamps illuminating the interior of the box. Furthermore, the beam projected by the spot light if sufficiently bright to properly illuminate the target at the remotest point, may be so bright as to create an objectionable glare when the target is closer to the observer.

To take care of these conditions, there is provided in the illustration, an adjustable rheostat 38, Figs. 1, 6 and 9, in the circuit of the light projector, shown driven by worm gearing 39, from the sprocket shaft 28, and arranged to increase the brillancy of this lamp with travel away from the observer and to reduce the power of this light or to dim it out entirely with approach of the target toward the observer.

The sight tube 40, is shown in Fig. 8 supported for universal movement in line with a larger size opening 41, in the front wall of the cabinet, by means of a screw stem 42, loosely and adjustably suspended from bracket 43, by a thumb nut 44, with a spring 45, aiding in holding the tube in various adjusted positions.

The special construction of the sight tube is shown in detail in Fig. 8. There, a lamp 45, in back of an orange tinted stencil 46, with the aid of lens 47, projects the image of the ring and center spot of a gunner's sight onto the reflecting screen 48, located in the barrel of the tube. The lamp is connected in circuit by a flexible cord 45a, Figs. 1, 2, 7 and 8, so as not to interfere with the universal adjustments of the sighting tube.

At the inner end of the tube, there is mounted a reducing lens 49, which brings the size of the image down to that necessary to represent the target at the extreme yardage which the trainer is designed to depict, such as one thousand yards. By means of this reducing lens, a machine only about ten feet long can be made to reproduce the effects observable at a range of a thousand yards or more.

Fig. 10 shows on a reduced scale the appearance of the image on the carriage and Fig. 12 shows approximately full scale, the appearance of the target viewed through the tube with the reflected ring and center 50, 51, of the gun sight superposed on the target.

Instead of representing the targets as silhouettes on a sheet of paper, cloth or other flexible medium, the targets may be provided by small physical models, such as represented at 52, in Fig. 11, on a wire or other more or less invisible support 53, on the movable carriage 54, and, if desired, connections may be provided for turning the model into different positions representing various attitudes or directions of flight.

The first method of picturing the target may be preferred in that it enables quick changing of the images from one kind of aircraft to another. The changing of the targets may be effected by hand or by motor.

In Figs. 1 and 2, a motor 55, is shown mounted on the carriage and arranged to advance the image carrying strip one way or the other, through a worm gear drive 56, Figs. 3, 4 and 5, turning horizontal shaft 57, carrying a gear 58, in mesh with pinions 59, 60, on a rocker 61, frictionally centered on the shaft at 62, so that with rotation in one direction, it will carry one pinion 59, into mesh with the gear 63, of the upper roll 19, and with rotation in the opposite direction, carry the other pinion 60, into mesh with gear 64, of the lower roll 20.

The image changing motor 55, may be controlled from a reversing switch 65, shown in Fig. 7, mounted on the front of the cabinet.

The wiring connections for running the target shifting motor in opposite directions are not shown, but these may include a flexible cable long enough for the travel of the carriage in opposite directions and having a take-up at the back of the carriage which will keep the slack of the cable clear of the carriage travel.

By properly controlling the motor, various targets can be quickly shifted into and out of the vision of the student and while the carriage is stationary or in motion in either direction. The universal mounting of the sight tube enables the student to train and keep the sight trained on the target, to recognize size and type of aircraft and to quickly gain a sense of estimating distance, necessary lead for accurate gunfire and the like.

To simulate appearances under different light conditions, a rheostat or other dimming control may be provided for the constant light 36, such as indicated at 66 in Figs. 1 and 7.

The elongated casing forms in effect a light tunnel with the aircraft image appearing as in free space when viewed through the reducing lens sight. The sight can be freely turned in different directions to simulate the pointing of an aircraft or the guns on an aircraft. The strip carrying silhouettes can be painted or otherwise embellished for different cloud and illuminating effects. If desired, the target carriage may be built up as a dimensional diorama or otherwise constructed to provide the greatest realism possible.

What is claimed is:

1. An aircraft identification and range estimating trainer, comprising a light tunnel, a target member operable back and forth in said tunnel, a freely adjustable reducing lens sight directed at said target, means for illuminating said target and means for automatically reducing illumination of the target with approach of the same toward said sight and for automatically increasing illumination with movement of the target away from the sight.

2. An aircraft identification and range estimating trainer, comprising a light tunnel, a target member operable back and forth in said tunnel, a freely adjustable reducing lens sight directed at said target, means for shifting said target toward and away from said sight and interconnected means for increasing illumination of the target with movement away from the sight and reducing illumination of the target upon movement toward said sight.

3. An aircraft identification and range estimating trainer, comprising a casing, a sight at one end of said casing, a target carrier operable back and forth in said casing, means for illuminating the interior of the casing, means for projecting light directly on the target carrier and means for automatically increasing the intensity of said projected light in accordance with movement of the target carrier away from the sight.

4. An aircraft identification and range estimating trainer, comprising a casing, a sight at one end of said casing, a target carrier operable back and forth in said casing, means for illuminating the interior of the casing, means for projecting light directly on the target carrier, means for automatically increasing the intensity of said projected light in accordance with movement of the target carrier away from the sight, including a rheostat and drive means for shifting the carrier connected to operate said rheostat.

5. An aircraft identification and range estimating trainer, comprising a casing, a carriage operable back and forth in said casing, a sight at one end of said casing, shiftable target carrying medium on said carriage, a motor on said carriage arranged to shift said target carrying medium, means on said casing for controlling said motor and located at the sighting end of the casing, and controllable means within the casing for variably illuminating said shiftable target carrying medium on the carriage.

6. An aircraft identification and range estimating trainer, comprising a casing, a sight at one end of said casing, a carriage operable in said casing, a target carrying strip and reversibly operable supporting rolls therefor mounted on said carriage, a reversible motor mounted on the carriage, shiftable gearing for driving one or the other of said rolls and connecting gearing from said motor for effecting automatic shifting of said gearing upon operation of said motor in opposite directions.

7. In aircraft identification and range estimating, an elongated, illuminated light tunnel, a target member operable back and forth in said tunnel and a sighting device at one end of said tunnel mounted for training on said target member and comprising a sighting tube containing a reducing lens system and having means for optically projecting the image of a gunner's ring sight on the target member sighted through said tube.

JOSEPH W. JONES.